United States Patent [19]
Harrell

[11] Patent Number: 5,937,838
[45] Date of Patent: Aug. 17, 1999

[54] FUEL VAPORIZING SYSTEM FOR INTERNAL COMBUSTION ENGINES

[75] Inventor: Paul L. Harrell, Newborn, Ga.

[73] Assignee: Vaporizer LLC, Newborn, Ga.

[21] Appl. No.: 08/906,131

[22] Filed: Aug. 5, 1997

Related U.S. Application Data

[63] Continuation of application No. 08/576,884, Dec. 21, 1995, abandoned
[60] Provisional application No. 60/004,166, Sep. 22, 1995.
[51] Int. Cl.$^6$ .................................................. F02M 29/04
[52] U.S. Cl. ......................................... 123/593; 48/189.6
[58] Field of Search ................................... 123/590, 591, 123/592, 593; 48/189.6

[56] References Cited

U.S. PATENT DOCUMENTS

| | | | |
|---|---|---|---|
| 4,020,812 | 5/1977 | Hayward | 123/593 |
| 4,031,876 | 6/1977 | Hoots | 123/593 |
| 4,089,314 | 5/1978 | Bernecker | 123/593 |
| 4,359,035 | 11/1982 | Johnson | 123/593 |
| 4,476,843 | 10/1984 | Peña-Medina | 123/593 |
| 4,491,118 | 1/1985 | Wooldridge | 123/593 |
| 4,715,346 | 12/1987 | Dempsey | 123/593 |
| 5,207,714 | 5/1993 | Hayashi et al. | 123/590 |
| 5,353,772 | 10/1994 | Wallace et al. | 123/590 |
| 5,429,102 | 7/1995 | Edwards et al. | 123/593 |
| 5,437,258 | 8/1995 | Williams et al. | 123/593 |

Primary Examiner—Erick R. Solis
Attorney, Agent, or Firm—Womble Carlyle, Sandirdge & Rice

[57] ABSTRACT

A method and apparatus for assisting in the reduction of pollutants from liquid-fuel burning (e.g. internal combustion) engines comprises, in a first sense, methods and apparatus for subjecting liquid fuel to multiple stages of vaporization before entering the combustion chambers of internal combustion engines, and, in another sense, method and apparatus for interposing a screening device between a first source of misted fuel (providing first vaporization) and the combustion chamber, thereby accomplishing at least a second vaporization of the fuel prior to combustion. The embodiments include, for example, (i) retrofit apparatuses and methods in the form of an improvement to the air and gas introduction assemblies of a liquid-fuel burning engine (such as, for example, a prior art automobile internal combustion engine or a lawnmower engine outfitted with a carburetor), which improvement comprises primarily the introduction of a screening device between the air/fuel mixture outlet of the carburetor (functioning as the first source of misted fuel) and the intake of the engine combustion chamber, and (ii) unitary assembly embodiments incorporating within a unitary assembly a first source of misted fuel and a screening device such that fuel which enters the unitary assembly as a liquid stream exits the unitary assembly as a finally misted ("vaporized") air/fuel mixture which is subsequently delivered to the intake of the engine (combustion chamber), or, in some embodiments, introduced to a prior art carburetor associated with the engine.

17 Claims, 7 Drawing Sheets

FUEL VAPORIZING SYSTEM FOR INTERNAL COMBUSTION ENGINES

CROSS REFERENCE TO RELATED APPLICATION

This is a continuation-in-part of provisional application Ser. No. 60/004,166, filed Sep. 22, 1995.

This application is a continuation of application Ser. No. 08/576,884, filed Dec. 21, 1995, now abandoned.

BACKGROUND OF THE INVENTION

The present invention relates generally to the field of internal combustion engines. More particularly, the present invention relates to the field of fuel delivery systems for internal combustion engines and, also, to the field of pollution control systems for internal combustion engines.

The fuel burning efficiency of internal combustion engines is, in large part, determined by the physical state of the fuel upon entering the combustion chambers thereof. In conventional internal combustion engines, the fuel is mixed with air and then sprayed, in mist form, into the combustion chambers. Subsequently, a spark is produced within the combustion chamber that ignites many of the tiny droplets of misted fuel and air therein. The energy supplied by the engine is generated by the ignition of the tiny droplets of misted fuel and air just described. Therefore, the engine efficiency, in such terms as miles per gallon and power output per fuel consumed, etc., correlates directly to the amount of fuel (i.e. number of fuel droplets) left unburned after ignition in the combustion chambers of the engine.

Presently, internal combustion engines burn only a fraction of the fuel injected into the combustion chamber. Consequently, much of the unburned fuel is ejected by the engine's exhaust system into the atmosphere. Therefore, conventional internal combustion engines are rendered highly inefficient in addition to being a major contributor to atmospheric pollution. In passenger cars and trucks on the road today, recirculation systems have been devised in an effort to capture and reuse the unburned fuel after ejection from the combustion chamber. However, with these systems, much of the fuel is still left unburned and eventually escapes into the atmosphere. Also, attempts have been made to increase the amount of fuel burned during ignition in the combustion chamber. These attempts generally include a heating device or system that seeks to heat and thereby expand the liquid fuel, while keeping the fuel in the liquid state, before entering the fuel injectors or carburetor. Although the engine efficiency may be slightly increased thereby, much of the fuel is still left unburned after ignition within the combustion chambers of the engine. Furthermore, these prior systems and devices generally include relatively complex support systems and components that must be integrated into the various existing supply and power systems of the engine. There is, therefore, a need in the industry for an apparatus and method that seeks to improve the fuel burning efficiency of internal combustion engines.

SUMMARY OF THE INVENTION

Briefly described, the present invention comprises a method and apparatus for assisting in the reduction of pollutants emitted from liquid-fuel burning (e.g. internal combustion) engines. The invention, in a first sense, comprises methods and apparatus for subjecting liquid fuel to multiple stages of vaporization before entering the combustion chambers of a liquid-fuel burning engine. In another sense, the present invention comprises method and apparatus for interposing a screening device between a first source of misted fuel (providing first vaporization) and the combustion chamber, thereby accomplishing at least a second vaporization of the fuel prior to combustion. Furthermore, in some embodiments, the present invention comprises method and apparatus for introducing air into the flow of misted fuel at a point between the first source of misted fuel and the screening device.

In a first disclosed embodiment of the present invention, the invention is embodied in the form of an improvement to the air and gas introduction assemblies of a liquid-fuel burning engine, such as, for example, a prior art automobile internal combustion engine outfitted with a carburetor. The improvement of this first embodiment comprises primarily the introduction of a screening device between the air/fuel mixture outlet of the carburetor and the intake of the engine combustion chamber. In accordance with this first embodiment of the present invention, the standard carburetor (for example, a standard automobile carburetor) functions as the first source of misted fuel providing a first stage of vaporization and the screening device provides a second vaporization stage. In accordance with a preferred method and apparatus of this embodiment, the screening device is a retrofit assembly which mounts a finely meshed screen member, or plurality of screen members, adjacent the intake manifold of the engine, and the carburetor outlet port is mounted directly over the screen member. In the case of a multiple port carburetor, a separate screening device is preferably mounted over each of the separate manifold intake ports associated with the carburetor ports.

In a second disclosed embodiment of the present invention, the invention is embodied, also, in the form of an improvement to the air and fuel introduction assemblies of a liquid-fuel burning engine, such as, for example, a prior art lawn mower engine and, in some circumstances, a prior art automobile engine. The improvement of this first embodiment relates most particularly to (i) the reshaping of the outlet orifice of the fuel/air delivery tube through which air and liquid fuel are introduced to the engine (combustion chamber) intake, (ii) the introduction at or near the outlet orifice of the delivery tube of a screening device, and (iii) the addition of an air delivery device at a point upstream from the screening device. The combination of the reshaped delivery tube, screening device and air delivery device shall be, sometimes, referred to herein as the improved air/fuel introduction assembly. In this second disclosed embodiment, the improved air/fuel introduction assembly preferably functions as a retrofit assembly replacing the fuel delivery tube connecting the carburetor output to the engine (combustion chamber) input. In this second disclosed embodiment, the standard carburetor (for example, the standard lawnmower carburetor) functions as the first source of misted fuel, while the screening device (assisted by the air delivery device) functions as a second stage of vaporization.

In other alternate embodiments of the present invention, the invention comprises a unitary assembly incorporating within the unitary assembly a first source of misted fuel and a screening device. The first source of misted fuel (also referred to as the "misted fuel source") comprises, preferably, a jet, nozzle, or other liquid spraying device which accepts liquid fuel from a fuel supply and sprays that fuel to create an output of misted fuel defining a plurality of separate fuel particles (or liquid droplets). The screening device of these alternate embodiments comprises alternative combinations of screen members (as, for example, meshed members and silica packed members) arranged in various combinations downstream from the misted fuel source to provide at least a second vaporization stage. The unitary assembly in some of these embodiments further includes an air delivery device introducing air into the unitary assembly downstream of the misted fuel source and upstream of the screening device. In accordance with the unitary assembly embodiments, that fuel which enters the unitary assembly as a liquid stream exits the unitary assembly as a finely misted ("vaporized") air/fuel mixture which is subsequently delivered to the intake of the engine (combustion chamber), or, in some embodiments, introduced to a prior art carburetor associated with the engine. Throughout this application, the unitary assembly of these alternate embodiments is also referred to as the "unitary, fuel vaporization unit" or the "fuel vaporization unit."

More specifically, each of the unitary assembly embodiments of the present invention provides a fuel vaporization unit that is easily installed and retrofitted into the fuel systems of internal combustion engines. The fuel vaporization unit includes a vaporization cavity wherein liquid fuel is converted into an extremely fine vapor. The vaporization cavity is divided into separate vaporization chambers by filtering screens. A main vaporization chamber is filled with a mass of silica crystals which provides a storage reservoir for the vaporized fuel as well as to further promote the vaporization of the fuel. The intake side of the engine is connected to the outlet of the fuel vaporization unit and creates a pressure vacuum in the vaporization cavity that draws the fuel through the vaporization cavity. A fuel pump delivers liquid fuel from the engine's fuel reservoir, into a bottom vaporization chamber. The liquid fuel is sprayed into the bottom vaporization chamber in a manner that facilitates the vaporization of the liquid fuel. The fuel vapor is drawn through the vaporization chambers and the filtering screens to emerge from the vaporization cavity in a highly vaporized state. The highly vaporized fuel (which is mixed with air at one or more various stages as seen in the various embodiments) is directed into the carburetor or the intake manifold of the engine depending on the type of fuel system provided therewith. In the preferred embodiment of the present invention, the fuel vaporization unit includes a heat jacket defining a heating chamber substantially surrounding the vaporization cavity. Hot fluids are circulated through the heating chamber and heat the fuel therein which further promotes the vaporization process. The vaporization cavity may be divided into more or less vaporization chambers by adding one or more vaporization screens or removing one or more of the vaporization screens, respectively.

It is, therefore, an object of the present invention to increase the overall efficiency of internal combustion engines.

Another object of the present invention is to so vaporize the liquid fuel before injection into the combustion chambers of an internal combustion engine that substantially all the fuel is burned therein.

Yet another object of the present invention is to substantially reduce the amount of toxic pollutants emitted into the earth's atmosphere by internal combustion engines.

Still another object of the present invention is to substantially increase the mileage per quantity of fuel consumed for vehicles with internal combustion engines.

Still another object of the present invention is provide an apparatus that is easily installed into the existing fuel supply systems of internal combustion engines.

Still another object of the present invention is to substantially increase the power output per quantity of fuel consumed of internal combustion engines.

Still another object of the present invention is to substantially reduce operating costs for owners of vehicles and devices powered by internal combustion engines.

Still another object of the present invention is to retrofit prior art liquid-fuel burning engines of the type associated with prior art carburetors and fuel injection systems with a modification intended to aid in the reductions of emitted pollutants.

Other objects, features, and advantages of the present invention will become apparent upon reading and understanding this specification, when taken in conjunction with the accompanying drawings.

BRIEF DESCRIPTION OF THE DRAWING

FIG. 1b is an isolated perspective view of a screening device for use with the embodiment of FIG. 1a.

FIG. 1c is an isolated planar view of a multiple port screening device mounting assembly, shown in location on an intake manifold, for use with a multiple port carburetor, in accordance with the invention embodiment of FIG. 1a.

FIG. 3b is an isolated, outlet end view of the air/fuel introduction assembly of FIG. 3a, taken along the direction of arrow 3b of FIG. 3a.

FIG. 4b is an outlet end view of the tube of FIG. 4a, taken along the direction of arrow 4b of FIG. 4a.

DETAILED DESCRIPTION OF THE PREFERRED EMBODIMENTS

Figure 1A:
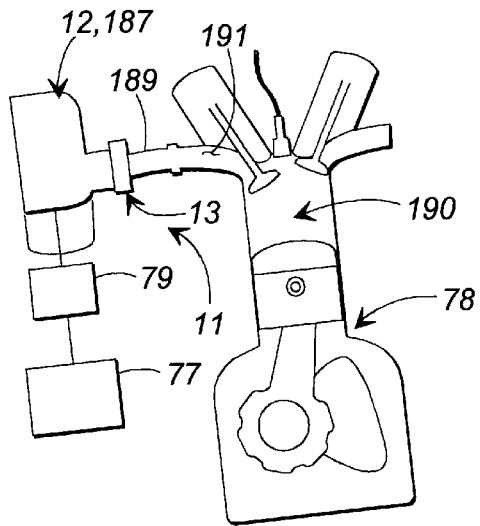
FIG. 1a is a diagrammatic representation of a fuel vaporizing system in accordance with a first preferred embodiment of the present invention, shown in association with an internal combustion engine.
Figure 1B:
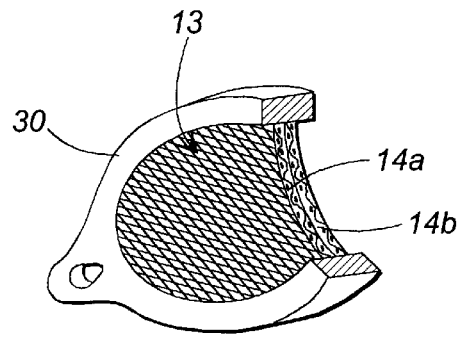

Referring now in greater detail to the drawings in which like numerals represent like components throughout the several views, FIG. 1 shows a diagrammatic representation of a fuel vaporizing system 11 in accordance with a first preferred embodiment of the present invention, mounted to an internal combustion engine 78 (e.g., at its intake manifold 189). The engine 78 is seen as comprising typical components, including a combustion chamber 190, inlet port 191, valves, piston and spark plug. The fuel vaporizer system 11 of the first preferred embodiment of FIG. 1 is seen as being comprised of two vaporization stages—the first being referred to herein as the first or primary misted fuel source 12 and the second being a screening device 13. The embodiment of FIG. 1 is understood to be a retrofit embodiment wherein the improvement to the prior art apparatus rests in the addition of the screening device 13 to the combination of a previously cooperating internal combustion engine 78 and carburetor 187. The screening device 13 is, in the preferred embodiment of this first, retrofit embodiment of FIG. 1, comprised of one or more meshed screen members 14 mounted fully across the inlet orifice of the intake manifold 189. In the case of two or more screen members 14, the screen members are stacked abutting one another as shown in FIG. 1b.

The screen members 14, preferably, define a meshing with holes (or openings) through which fuel and air mist resulting from the primary fuel misting source 12 (i.e., carburetor 187 will pass. Whereas the screen members 14 are acceptably comprised of any materials that can maintain their integrity in the subject environment (heat, fuel soaked, etc.), examples of preferred screen materials are stainless steel, brass, and copper. Whereas, larger or smaller mesh sizes are acceptable for various engine/carburetor combinations, the size is preferably in the range of 20 mesh to 100 mesh. Currently, the inventors best mode of selecting the optimal number of screen members 14 making up the screening device 13 and the optimal sizing of the screen mesh of each screen 14 is through experimentation—trial and error—whereby for each different engine, different carburetor, and different engine/carburetor combination a skilled mechanic, using his "trained ear" listening for a finely tuned engine/carburetor and seeking acceptable power, acceleration, idle/load performance, attempts a variety of screen mesh sizes and combinations.

In this embodiment, fuel is misted a first time by the carburetor 12/187 where it is mixed with air and vaporized a first time; and this once-vaporized fuel/air mixture is again vaporized at the screening device 13. In this embodiment, any air required to be mixed with the air/fuel mixture at the second stage of vaporization (i.e., at the screening device 13) is drawn from the air inlets of the carburetor 187. Again, at this time, the inventor's best mode for adjusting the amount of air flow is trial and error experimentation wherein the skilled mechanic listens for his interpretation of finely tuned and acceptably performing engine system.

Figure 1C:
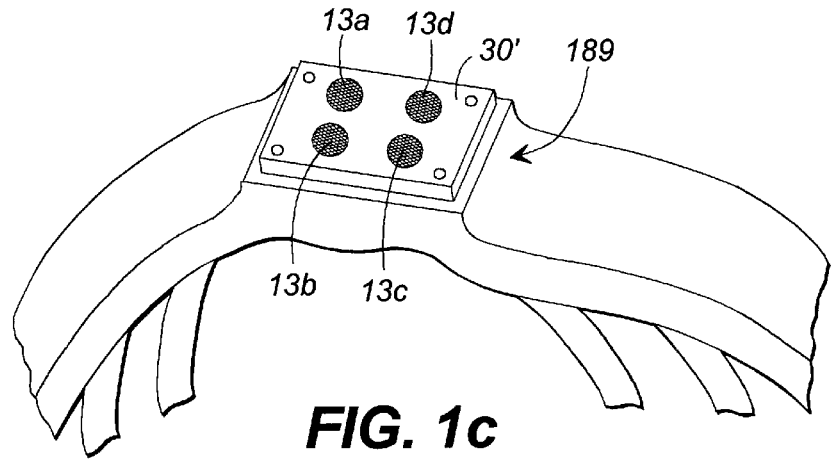

In one example of this first embodiment, the screening device 13 is mounted in a mounting plate 30 which is bolted on the intake manifold 189 by common bolts which bolt the carburetor 187 to the intake manifold. The screen member 14 of the screening device 13, preferably, spans completely across the inlet opening of the intake manifold. In multi-port carburetor embodiments, every fuel delivery port is outfitted with a screening device 13 downstream of the carburetor 12/187. The screening devices 13 are, in one example, bolted independently to the manifold or, as shown in FIG. 1c separate screening devices 13a–13d are mounted in spaced relationship (corresponding to locations of the multiple ports) to a common mounting plate 30' for ease of installation. The plate 30' is mounted directly between the carburetor and manifold by removing the carburetor, placing the plate on the manifold 189 with the screening devices aligned with the ports, and bolting the carburetor back on to the manifold with the plate 30' sandwiched in-between.

By way of example, one successful experiment of the embodiment of FIG. 1, utilized two screening devices 13a–13b mounted to a plate 30'; each screening device comprising three abutting screen members including two stainless steel screens, each with meshing of 25 mesh (i.e., holes per inch), and one stainless steel screen of 75 mesh. The plate 30' was mounted in a 1974 Chevrolet El Camino with V-8, 350 cubic inch, four-stroke cycle, internal combustion engine between the intake manifold and a Rochester 2 barrel carburetor.

Figure 2:
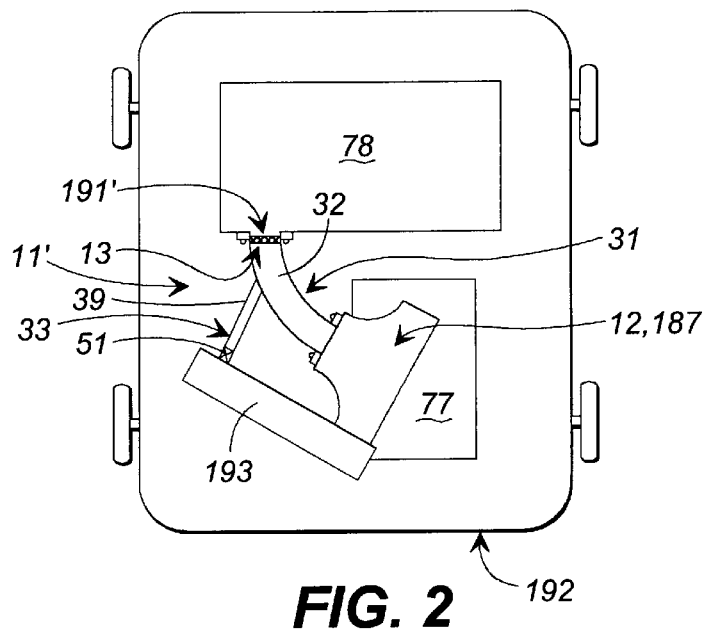
FIG. 2 is a diagrammatic representation of a fuel vaporizing system in accordance with a second preferred embodiment of the present invention.
Figure 3A:
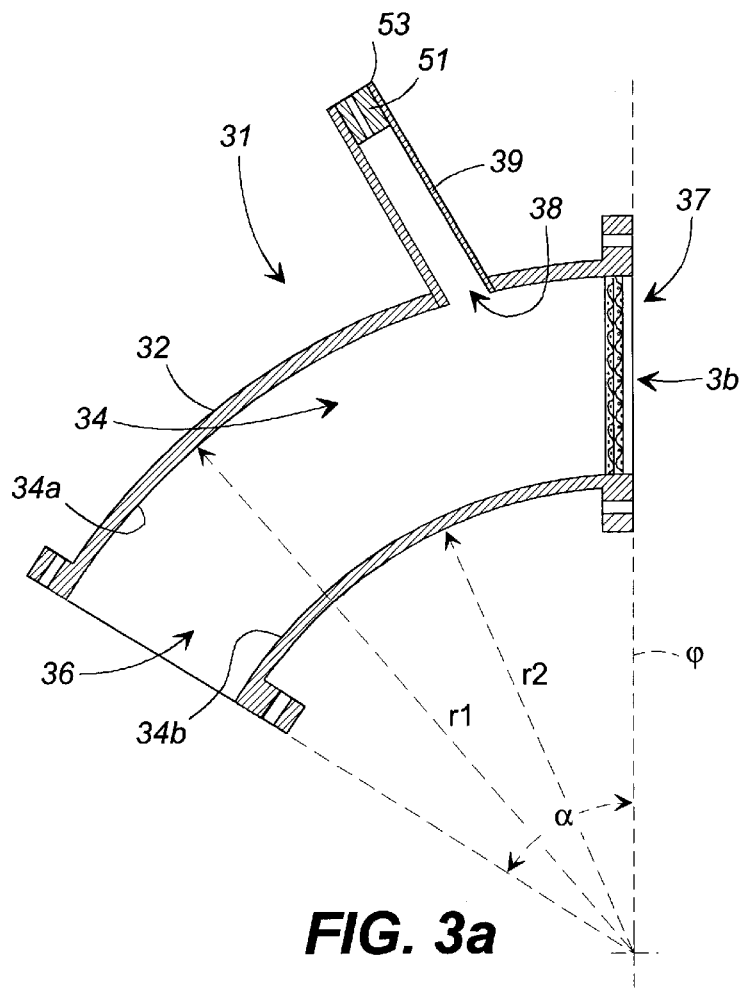
FIG. 3a is a planar, cross-sectional view of a representative air/fuel introduction delivery assembly of the fuel vaporizing system of the embodiment of FIG. 2.

FIG. 2 shows a schematic representation of the Fuel Vaporizer System 11 in accordance with a second preferred embodiment of the present invention. This embodiment is characterized by an air/fuel delivery assembly 31 mounted between an engine 18 and a primary misted fuel source 12. FIG. 3a shows a representation, in slightly greater detail, of the air/fuel delivery assembly 31 comprising a delivery tube 32, a screening device 13, and an air delivery device 33, which air/fuel delivery assembly 31 is in fluid communication between an engine 18 and the primary misted fuel source 12.

In a first example of an operating embodiment of the second preferred embodiment of FIG. 2, the engine 78 represents a piston driven, liquid-fuel (e.g., gasoline) engine and the misted fuel source 12 represents a prior art carburetor 187. One example, (to which the invention is not to be limited) to which this second embodiment is applied, is a standard lawn mower (for example, a Briggs & Stratton 8–15 horsepower lawn mower, including generally a rolling frame 192 on which is mounted a small, liquid-burning engine 78 (for example, a four-stroke cycle rod and piston engine). The engine 78 is seen as comprising, among its other components, a fuel and air inlet port 191' and a fuel reservoir 77. The carburetor 12/187 is a standard lawn mower carburetor (e.g. as associated with the mentioned Briggs & Stratton lawn mower) mounted on the rolling frame 192 at a fixed position relative to the engine 78.

Figure 4A:
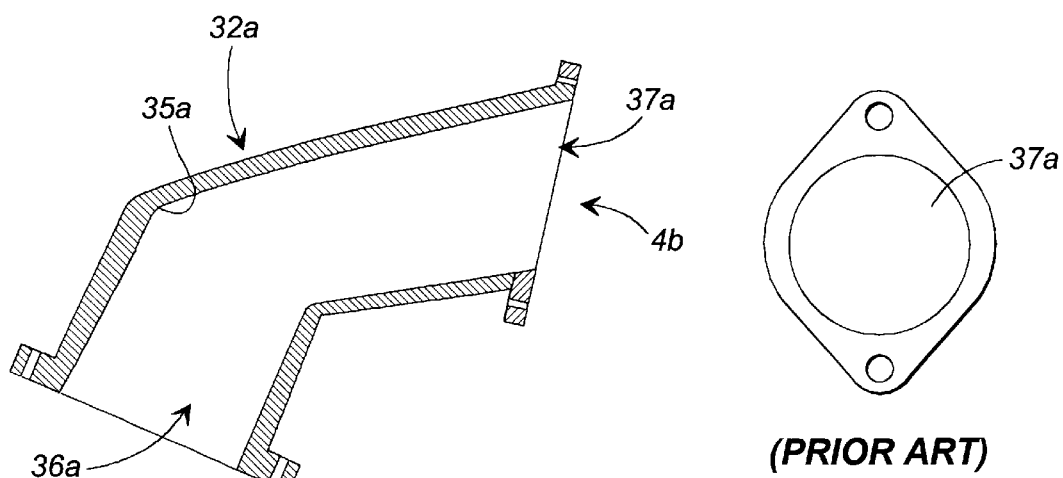
FIG. 4a is a planar, cross-sectional view of one example of a prior art air/fuel delivery tube.
Figure 4B:
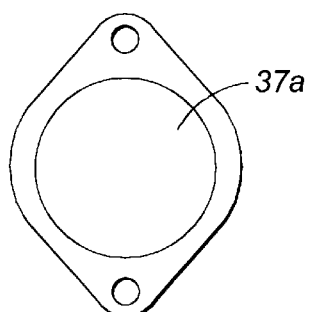

In accordance with this second embodiment, the fuel vaporizer system 11' includes the prior art carburetor 187 and a retrofit air/fuel delivery assembly 31 replacing the standard delivery tube 32a of the prior art machine (see FIG. 4a). In this embodiment, the air/fuel delivery assembly 31 comprises an improvement to the prior art machine. With reference to the schematic of the prior art component seen in FIG. 4a, depicted is a fuel/air delivery tube 32a which may, often times, have one or more of the following characteristics: (i) a hollow, cylindrical, bent tube where the inside wall of the tube defines at the elbow 35a an angular transition, (ii) orifices and apertures are limited solely to an inlet orifice 36a and an outlet orifice 37a; (iii) an oblong outlet orifice 37a (as represented generally in FIG. 4b).

Figure 3B:
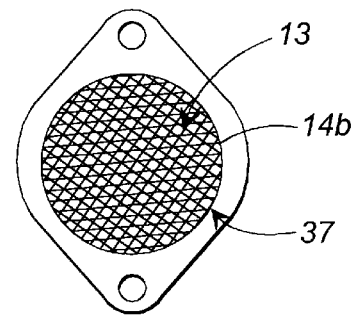

The delivery tube 32, in accordance with this second preferred embodiment of the present invention, is preferably defined by the following characteristics; (i) a generally cylindrical internal passage 34 having smooth, curved inner walls—preferably, the walls being defined in planer cross-section (see 34a, 34b) by concentric arcs of constant radius (r1, r2), and most preferably defining arc angles ($\alpha$) less than or equal to 90 degrees; (ii) an outlet orifice 37 which, in its end view (see FIG. 3b) defines a circle, and, preferably, as seen in FIG. 3a, the orifice occupies generally the plane($\phi$) defined by a common radius of the two concentric arcs for the inner walls; (iii) an air inlet aperture 38, defined at a position along the length of the tube upstream from the outlet orifice 37, through which air is introduced in a controllable manner by the air delivery device 33, as discussed further below. In alternate embodiments, the internal passage 34 of the tube 32 of the present invention has a circular cross-section but tapers in internal diameter from narrower at the inlet orifice 36 to wider at the outlet orifice 37 (i.e., the inner walls 34a, 34b being no longer concentric).

The screening device 13 is, in the preferred embodiment of this second, retrofit embodiment, comprised of one or more meshed screen members 14 mounted fully across the outlet orifice. In the case of two or more screen members, the screen members 14a, 14b are preferably stacked abutting one another similar to the manner shown in FIG. 1b. The screen members 14, preferably, define a meshing in the range of 20 mesh to 100 mesh. The optimal sizing of the screen mesh is selected, in combination with the amount of air introduction, for each different engine, carburetor, and engine/carburetor combination, at the present time, by experimentation using the trained ear of a skilled mechanic listening for a finely tuned engine/carburetor.

The air delivery device 33 comprises an inlet conduit 39 attached to the air aperture 38, and an adjustable valve 51 (such as an adjustable jet nozzle similar to a standard carburetor jet, screwed into the free end 53 of the inlet conduit 39) mounted to the inlet conduit for adjustably varying the amount and rate of air passing through the tube and aperture. Preferably, air enters the free end 53 of the air inlet conduit 39 through a filter 193, shown in FIG. 2 as being the same filter as prepares air for the carburetor 187 (though, alternatively, these are separate filters for the inlet conduit 39 and the carburetor 187).

Unitary Assembly Embodiments

The following embodiments of the present invention are those in which the vaporization stages of the fuel vaporizer system 11 of the present invention are embodied within a unitary (encased) assembly which unitary assembly is, in its preferred applications, utilized in place of a carburetor and fuel injection system or, is located upstream of the carburetor of a prior art engine. In connection with all of the unitary assembly embodiments to be described hereafter, the combination of components comprising the multiple stages of vaporization in the previously mentioned embodiments will be referred to hereafter as the fuel vaporization unit 19. In the fuel vaporization unit 19 of the following embodiments, the multiple stages of vaporization, including the primary misted fuel source and subsequent stages of vaporization, are housed within the single unitary assembly. Each of the fuel vaporization units 19 of these unitary assembly embodiments is characterized by having the primary misted fuel source within the unitary encasement and is further characterized by a second stage of vaporization (ore at least a second stage of vaporization) also housed within the unitary container.

In an effort to show at least one generic association between the first embodiments (FIGS. 1 and 2) and the unitary assembly embodiments (FIGS. 6–10) of the present invention, the drawings of FIGS. 5, 8, 10, 11 have been identified with general indications of corresponding segments relating to a primary misted fuel source 12 (i.e., 12', 12", etc.) and a screening device 13 (i.e., 13', 13", etc.). However, this general association is not intended to prevent the characterization of multiple stages of vaporization in excess of two stages, nor to prevent the characterization of overlapping stages of vaporization.

Figure 5:
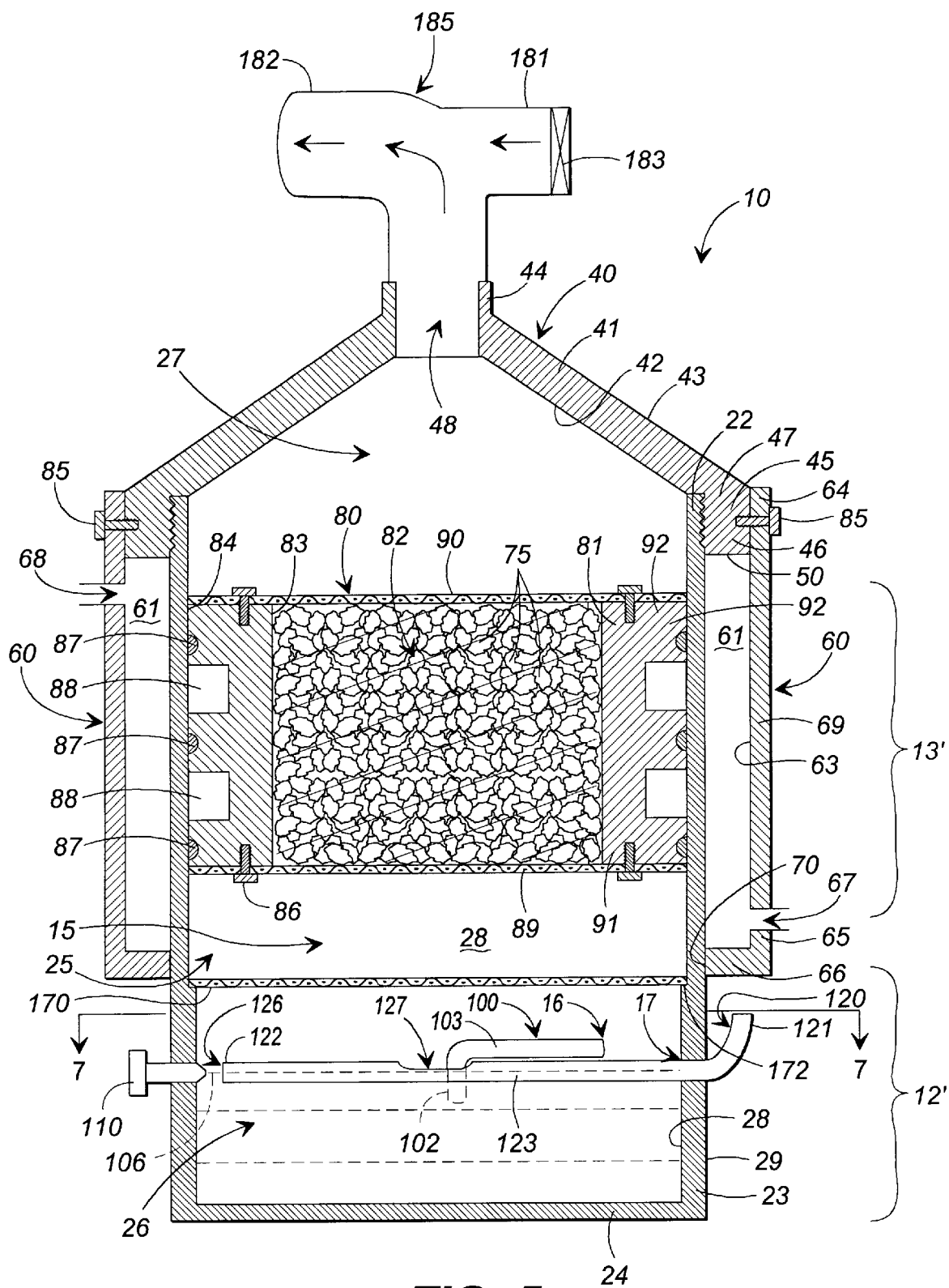
FIG. 5 is a partially sectioned, elevational view of a fuel vaporization unit in accordance with an alternate embodiment of the present invention.
Figure 9:
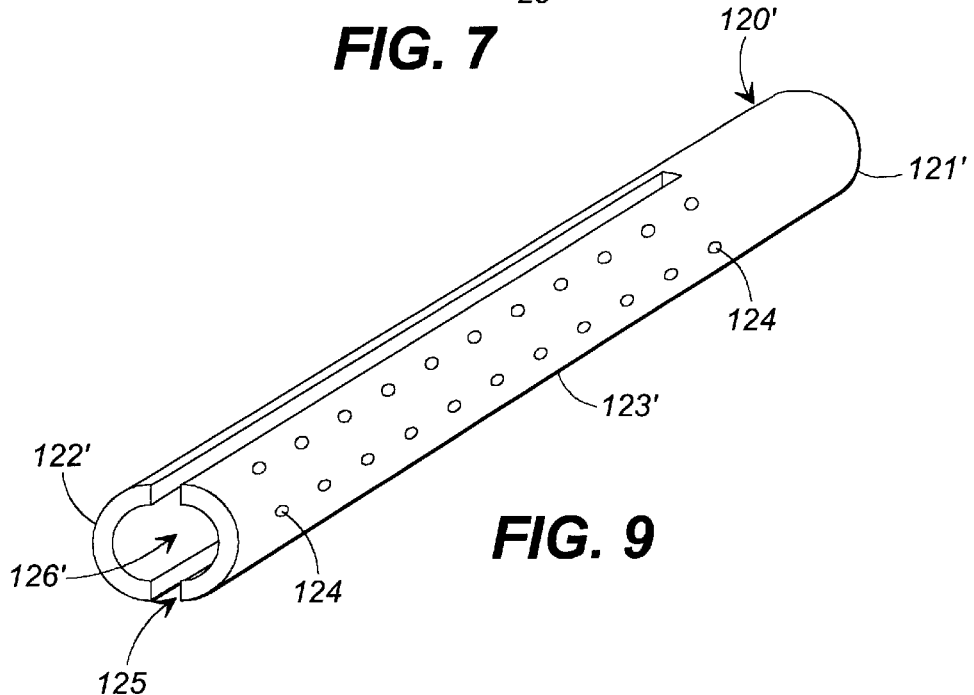
FIG. 9 is an isolated, end, bottom, perspective view of an air rod of the fuel vaporization unit of FIG. 8.

FIG. 9 is a partially sectioned, elevational view of a fuel vaporization unit 19 in accordance with the preferred unitary assembly embodiment of the present invention. In this preferred embodiment, the fuel vaporization unit 19 includes a primary body 20 including a cylindrical outer shell 21. The cylindrical outer shell 21 partially defines an axially extending vaporization cavity 25 therein. The cylindrical outer shell 21 is open at a top end 22, and is closed at a bottom end 23 by a bottom wall 24. A cap 40 is readily connected to the top end 22 of the primary body 20. In this preferred unitary assembly embodiment, the cylindrical outer shell 21 of the primary body 20 is generally shaped in the form of a cylindrical can and the cap 40 resembles an inverted funnel which together enclose the vaporization cavity 25. A heat jacket 60 partially surrounds the cap 40 and primary body 20 to define a heating chamber 61 extending 360 degrees around the primary body 20 and cap 40. An inner member 80 with a cylindrical inner shell 81 is sealingly disposed within the primary body 20. The cylindrical inner shell 81 defines a main vaporization chamber 82 (main chamber 82) disposed within the vaporization cavity 25. The vaporization cavity 25 is divided into a plurality of vaporization chambers. In the embodiment of FIG. 5, there are four vaporization chambers: a bottom vaporization chamber 26 (bottom chamber 26); a middle vaporization chamber 15 (middle chamber 15); the main chamber 82; and a top vaporization chamber 27 (top chamber 27).

The cylindrical inner shell 81 of the inner member 80 includes an inner surface 83 and an outer surface 84. The outer surface 84 defines a plurality of annular grooves (occupied by corresponding annular gaskets 87) for accepting the annular gaskets 87. In the preferred embodiment of the fuel vaporization unit 19, the annular gaskets 87 are acceptably, for example and not limitation, rubber O-rings. When properly seated in the annular grooves, the annular gaskets 87 slightly protrude from the outer surface 84 of the inner cylindrical member 80. The diameter of the outer surface 84 of the cylindrical inner shell 81 is slightly smaller than the diameter of an inner surface 28 of the cylindrical shell 21 of the primary body 20 so that the inner member 80 is sealingly and firmly press fit within the primary body 20 when properly installed therein. However, the inner member 80 is removable from within the cylindrical primary body 20 which facilitates cleaning and servicing of the fuel vaporization unit 19. The outer surface 84 of the cylindrical inner shell 81 further defines annular notches 88 which reduce the mass and thus the weight of the inner cylindrical member 80. A planar bottom annular vapor screen 89 and a planar top annular vapor screen 90 are sealingly connected to a bottom end 91 and a top end 92 of the cylindrical inner shell 81, respectively, and extend across and close off the main chamber 82 defined through the inner cylindrical member 80. The screens 89,90 are (for example and not limitation) acceptably sealingly connected to the ends 91,92 of the cylindrical inner shell 81 by common screws, one of which is shown as screw 86 in FIG. 5. The main chamber 82 is preferably filled with a multitude of closely packed silica crystals 75 (represented here by a plurality of particles, a few of which have been indicated by the number 75), the function of which will be described in greater detail below. The inner surface 28 along the bottom portion of the cylindrical outer shell 21 forms an annular shoulder 172. A lower vaporization screen 170 is press fit within the cylindrical outer shell 21 and seats against the annular shoulder 172 below the bottom vapor screen 89 of the inner member 80. The filtering pores of the lower screen 170 are preferably larger than that of screens 89,90.

The bottom chamber 26 is enclosed by the inner surface 28 of the cylindrical outer shell 21, the bottom wall 24 of the primary body 20, and the lower screen 170. The cylindrical outer shell 21 of the primary body 20 further defines a fuel inlet hole 16 proximate the bottom end 23 thereof and through which a fuel rod 100 is inserted and fixedly attached. The fuel rod 100 extends laterally into the bottom chamber 26 above and substantially across the bottom wall 24 along a direction parallel to a diameter of the bottom wall 24. The fuel rod 100 includes a first end 101 (FIG. 7), an opposite second end 102, and a tubular wall 103 defining an axially extending bore (not shown) therein . The first end 101 extends from the cylindrical outer shell 21 of the outer cylindrical member 20 and is open to pass fuel from a fuel reservoir 77 (see FIG. 6) into the bore defined in the fuel rod 100. The second end 102 extends into the bottom chamber 26 and curves down toward the bottom wall 24. The fuel entering the fuel rod 100 from the fuel reservoir 77 is under a higher pressure than the vacuum pressure created in the fuel vaporization unit 19 by the engine 78. In a conventional automobile fuel system, for example and not limitation, a fuel pump 79 further increases the pressure of the fuel before entering the fuel rod 100. The fuel is preferably sprayed through a spray nozzle 104 at the second end 102 of the fuel rod 100 into the bottom chamber 26 in an manner that agitates and facilitates the vaporization of the fuel.

A fuel level sensor 110 protrudes through the cylindrical outer shell 21 of the primary body 20 and into the bottom chamber 26. The fuel level sensor 1 10 operates a fuel shut-off valve 111 (see FIG. 6) and thereby prevents liquid fuel from rising above a predetermined maximum fuel level 106 in the bottom chamber 26. The fuel level sensor 110, shut-off valve, and communicating connections (not shown) therebetween are conventional parts that form a conventional, electrically powered, fuel control system that is familiar to persons skilled in the art.

The cylindrical outer shell 21 of the primary body 20 also defines an air inlet hole 17 through which an air inlet rod 120 is inserted and fixedly attached. The air inlet rod 120 extends parallel to the fuel rod 100 and substantially across the bottom chamber 26. The air inlet rod 120 includes a first end 121, an opposite second end 122, and a tubular body 123 defining an axially extending bore 126 (FIG. 7) therein . The first end 121 extends outside the cylindrical outer shell 21 of the primary body 20 and curves upward as shown. The first end 121 is open to pass air from an air source 76 into the bore 126 defined in the air inlet rod 120.

The cylindrical wall 123 further defines an air port 127 therethrough and opening up into the bottom chamber 26 away from the bottom wall 24. The air port 127 extends axially along the top of the air inlet rod 120 and communicates with the bore 126 therein. The second end 122 extends into the bottom chamber 26 and is open to further facilitate the flow of air into the bottom chamber 26. The air entering the air inlet rod 120 is under a higher pressure than the vacuum pressure created in the fuel vaporization unit 19 by the engine. In one example of this preferred unitary assembly embodiment, atmospheric air is acceptably the "air source" 76 and is directed into the air inlet rod 120. However, other air sources 76 may be used, including, for example and not limitation, air from the engine's air intake and circulation system or man-made external or internal sources from which hotter or cooler air may be obtained.

Preferably, the level sensor 110 and fuel rod 100 are oriented relative to one another such that the downwardly protruding second end 102 of the fuel rod (with its associated spray nozzle) dispenses fuel at a point just below the maximum fuel level 106. The air inlet rod 120 extends laterally into the bottom chamber 26 and is axially aligned with the fuel level sensor 110 such that the fuel level 106 is maintained by the fuel level sensor 110 within the air inlet rod 120 as shown—that is, such that, at the maximum fuel level 106, fuel occupies the lower one-half of the elongated tubular body 123

The middle chamber 15 is enclosed by the inner surface 28 of the cylindrical outer shell 21, the lower screen 170, and the bottom screen 89 of the inner member 80.

In the preferred unitary assembly embodiment of the present invention, the cap 40 includes a shell 41 which is preferably shaped in the form of an inverted cone-shaped funnel. The shell 41 includes an outer surface 43 and an inner surface 42. The inner surface 42 defines a spout 48 through a top end 44 (the tip portion of the funnel) of the cap 40 and extending along the axis of the cap 40 (the axis of the funnel). The spout 48 is in fluid communication with the bore (not shown) of a tubular body 180 of a cross member 185. A first end 181 of the cross member 185 is outfitted with a valve 183 (for example, a gate valve) through which atmospheric air (see air source 74 of FIG. 6) enters the first end 181, mixes and further vaporizes the fuel/air vapor from the top chamber 27. The entire fuel/air mixture then passes through a second end 182 of the cross member 185 and into the intake side of the engine (see direction arrows of FIG. 5). The shell 41 of the cap 40 extends inward at a bottom end 46 (the wide end of the funnel) to form a cylindrical section 45 of the shell 41 that extends vertically down along the outer surface 29 of the cylindrical outer shell 21 of the primary body 20 when the cap 40 is properly connected thereto. The inner surface 42 along the cylindrical section 45 of the cap 40 is threaded such that the cap 40, when properly mounted onto the cylindrical outer shell 21, is sealingly screwed onto a corresponding threaded section 47 at the top end 22 of the cylindrical outer shell 21.

The top chamber 27 is partially enclosed and defined by the inner surface 28 of the cylindrical outer shell 21, the inner surface 42 of the shell 41 of the cap 40, and the top annular vapor screen 90. The top chamber 27 is accessed by the spout 48 of the cap 40.

The heat jacket 60 includes a vertically extending hollow cylindrical shell 69 and a horizontal section 66. The horizontal section 66 extends laterally inward from a bottom end 65 of the shell 69. The portion of the shell 69 proximate a top end 64 thereof is sealingly connected to and extends along the outer surface 43 of the vertically extending cylindrical section 45 of the cap 40. An annular inner face 70 of the horizontal section 66 of the heat jacket 60 is sealingly connected to and surrounds the outer surface 29 of the cylindrical outer shell 21 at a point just above the air inlet rod 120 such that the vertically extending cylindrical shell 69 extends parallel to and substantially peripherally encases the cylindrical outer shell 21. In the preferred unitary assembly embodiment of the present invention, the top end 64 of the heat jacket is acceptably connected to the cap 40 by a plurality of metal screws 85. Whereas the annular inner face 70 proximate the bottom end 65 is acceptably welded to the outer surface 29 of the cylindrical outer shell 21. The heating chamber 61 is enclosed and defined by and inner surface 63 of the heat jacket 60, the outer surface 29 of the cylindrical outer shell 21, and an annular bottom face 50 proximate the bottom end 45 of the cap 40. The heating chamber 61 is accessed by a heat inlet 67 and a heat outlet 68 defined through the cylindrical shell 69. The heat inlet 65 is located proximate the bottom end 65 and the heat outlet 68 is located approximately 180 degrees around the cylindrical shell 69 proximate the top end 64 of the cylindrical shell 69.

Figure 6:
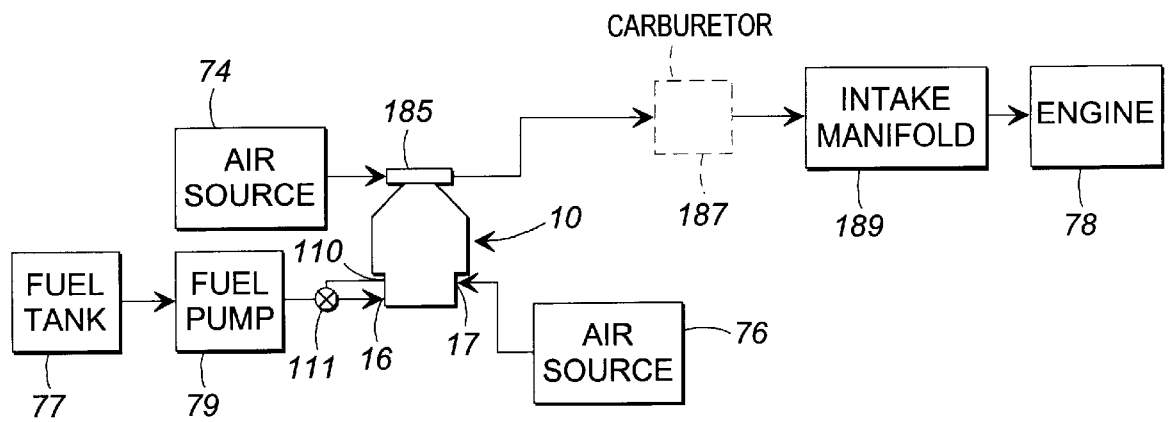
FIG. 6 is a schematic diagram of a fuel delivery system incorporating, in accordance with the present invention, the fuel vaporization unit of FIG. 5.
Figure 7:
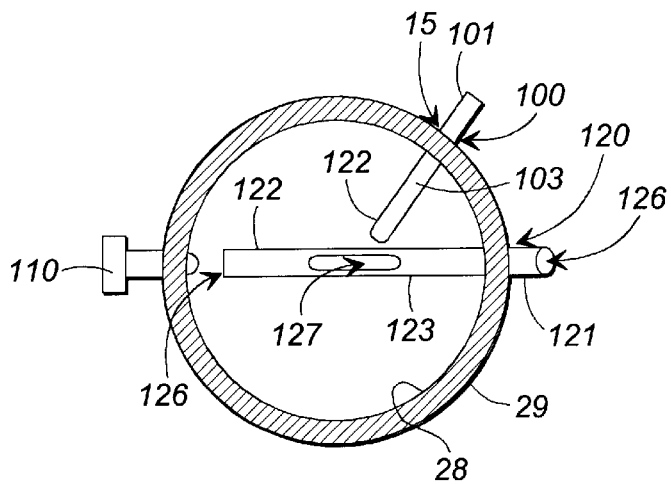
FIG. 7 is cross section of the fuel vaporization unit of FIG. 5 taken along lines 7—7.

Referring also to FIG. 6 which is a schematic diagram of a fuel delivery system incorporating the fuel vaporization unit 19, in accordance with the preferred unitary assembly embodiment of the present invention, the fuel vaporization unit 19 functions, in-line and in conjunction with the conventional components of a fuel delivery system of a combustion engine, to convert liquid fuel into a highly vaporized fuel/air mixture before entering the combustion chambers of the engine 78. The cross member 185 is connected to the intake side of the combustion engine 78 (i.e. the inlet of the carburetor 187 or directly to the intake manifold 189) which creates a low pressure (vacuum) that further draws the fuel (from the fuel tank 77 and fuel pump 79) and air (from the air source 76) through the fuel rod 100 (inlet 16) and the air inlet rod 120 (inlet 17), respectively, and into the bottom chamber 26. From the bottom chamber 26, the fuel and air mix and begin the vaporization process and is drawn up through the vaporization chambers 26,15,82,27 (where the fuel/air vapor is more highly vaporized) and into the carburetor or directly into the intake manifold of the engine. The first end 101 of the fuel rod 100 is supplied, aided by a fuel pump 79, with fuel from a fuel reservoir 77 (i.e., the fuel tank). The fuel is sprayed from the fuel rod 100 into the bottom chamber 26. The manner in which the fuel is sprayed into the bottom chamber 26, as just described with respect to the embodiment of FIG. 5, constantly agitates the pool of fuel which facilitates the initial vaporization of the fuel in the bottom chamber 26. The vaporization of the fuel is further enhanced by the change in pressure encountered by the liquid fuel; whereby high pressured fuel from the fuel reservoir enters the vacuumized bottom chamber 26. The fuel pools in the bottom chamber 26 to a level determined by the fuel sensor 110. The fuel sensor 110 controls the intake of fuel into the bottom chamber 26 as described above. The first end 121 of the air inlet rod is connected to an air source 76. Pressurized air is forced (due to engine vacuum) through the air inlet rod 120 and along the surface of the fuel therein, where the air further vaporizes and mixes with the fuel and accelerates the vaporization process. The vaporized fuel and air mix to form a vaporized fuel/air mixture in the upper portion of the bottom chamber, above the liquid fuel level 106. The vaporized fuel/air mixture is next drawn through the lower vaporization screen 170 and into the middle chamber which further vaporizes the fuel/air mixture. The vaporized fuel/air mixture next is drawn up through the bottom vaporization screen 89, the main chamber 82 and the close packed silica crystals 75 contained therein, and the top vaporization screen 90 to emerge into the top chamber 27 in a much more highly vaporized state. The screens 89,90 filter and further vaporize the fuel/air mixture. The silica crystals 75 in the main chamber 82 act to assist the further vaporization of the fuel/air mixture; and, further, as a result of the porous nature of the numerous chunks of silica crystals, the crystals function as a storage reservoir for the vaporized fuel/air mixture. Materials which function similar to the silica crystals 75 described above, such as charcoal, may also be placed in the main chamber 82. The highly vaporized fuel/air mixture is then funneled through the spout 48 and cross member 185 into the engine's fuel intake system (i.e., the carburetor or intake manifold).

The efficiency of the vaporization process is enhanced (i.e. the fuel/air mixture is more highly vaporized) when the fuel/air mixture is heated. However, heating the fuel is not required in order for the present invention to operate efficiently and to provide a highly vaporized fuel/air mixture and substantially increase the engine's overall efficiency. Therefore, the heat jacket is not required and is omitted in an alternate embodiment (not shown) of the present invention.

In the heat jacketed embodiment shown in FIG. 5, the fuel and air inside the primary body 20 is heated by circulating a heating fluid (not shown) through the heating chamber 61. In the heating chamber 61, the heating fluid circulates about the cylindrical outer shell 21 of the primary body 20 which heats the fuel/air mixture therein. One acceptable heating fluid, for example and not limitation, is hot exhaust gases (not shown) from the engine's exhaust system (not shown). For example, hot exhaust gases are directed through the heat inlet 67 and into the heating chamber 61. The exhaust gases eventually exit the heating chamber 61 through the heat outlet 68 and are directed back into the engine's exhaust system. The temperature of the fuel/air mixture contained within the fuel vaporization unit 19 is regulated by controlling the rate at which the hot exhaust gases enter the heating chamber 61. This is accomplished by presetting a conventional pinch valve (not shown) installed at a location between the heat inlet 67 and the heating fluid source. Another acceptable heating fluid is hot liquid (not shown). For example and not limitation, hot coolant liquid from the engines cooling system (not shown) is directed through the heat inlet 67 and into the heating chamber 61. The coolant liquid eventually exits the heating chamber 61 through the heat outlet 68 and is directed back into the engine's cooling system. Alternatively, the heat outlet 68 accepts the heating fluid which escapes via the heat inlet 67. The temperature of the hot coolant liquid and thus the temperature of the fuel/air mixture contained within the fuel vaporization unit 19 is regulated by the engine's temperature control system (not shown). For instance, the temperature control system found in conventional motor vehicles regulates the temperature of the coolant liquid and thus the fuel/air mixture to within the appropriate temperature range.

Screens made of different materials and with varying filtering capacities and ratings are considered within the scope of the present invention. In one example of the preferred embodiment of the present invention, the screens 89,90 are acceptably metal twenty micron screens. For example, in another example of this embodiment of the present invention, 100 micron metal screens and 20 micron metal screens are used, respectively, for bottom screen 89 and top screen 90.

Figure 8:
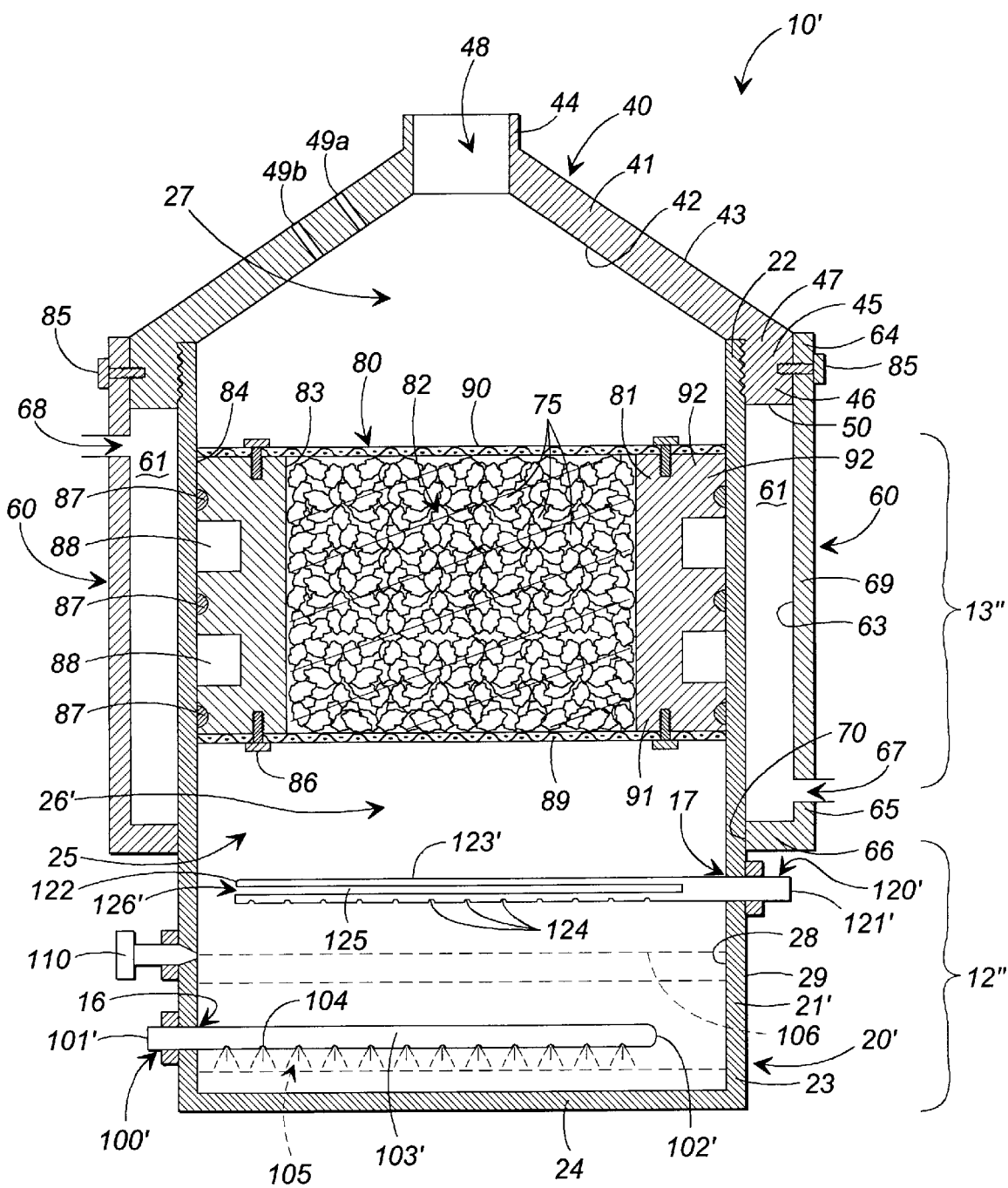
FIG. 8 is a partially sectioned, elevational view of a fuel vaporization unit in accordance with another alternate embodiment of the present invention.

FIG. 8 is a partially sectioned, elevational view of a fuel vaporization unit 19' in accordance with an alternate unitary assembly embodiment of the present invention. In this alternate embodiment, the lower vaporization screen 170 is omitted such that the bottom chamber 26' is defined between the bottom screen 89 of the inner member 80 and the bottom wall 24. The cross member 185 is also omitted. A fuel rod 100' extends laterally into the bottom chamber 26 above and substantially across the bottom wall 24 along a direction parallel to a diameter of the bottom wall 24. The fuel rod 100' includes a first end 101', an opposite second end 102', and a cylindrical wall 103' defining an axially extending bore (not shown) therein. The first end 101' extends from the cylindrical outer shell 21 of the outer cylindrical member 20' and is open to pass fuel from a fuel reservoir (not shown) into the bore defined in the fuel rod 100. The second end 102' extends into the bottom chamber 26' and is closed so that the fuel is forcibly sprayed into the bottom chamber 26' out of small fuel holes (one fuel hole 104 being so denoted in FIG. 50) defined through and arrayed along the cylindrical wall 103' of the fuel rod 100'. In FIG. 8, the fuel hole 104 is representative of the plurality of fuel holes defined through the cylindrical wall 103' of the fuel rod 100'. Furthermore, a jet 105 of fuel shown emanating from the fuel hole 104 is representative of the jets of fuel that emanate from the fuel holes defined through the cylindrical wall 103' of the fuel rod 100'. The fuel holes 104 are arrayed only along the portion of the fuel rod 100' that is within the bottom chamber 26'. In this alternate embodiment of the present invention, the fuel holes 104 are arrayed along the fuel rod 100 such that the fuel is sprayed in a direction toward the bottom wall 24.

Referring also to FIG. 9 which is an isolated, end, bottom, perspective view of an air inlet rod 120' of the fuel vaporization unit 19'. In FIG. 9, the air inlet rod is shown rotated 90 degrees about its axis in order to clearly depict the bottom thereof The air inlet rod 120' extends laterally (see FIG. 8) into the bottom chamber 26' above the fuel level sensor 110 (and thus above the pool of fuel). Furthermore, the air inlet rod 120' extends parallel to the fuel rod 100' and substantially across the bottom chamber 26'. The air inlet rod 120 includes a first end 121, an opposite second end 122, and a cylindrical body 123 defining an axially extending bore 126 therein . The first end 121 extends outside the cylindrical outer shell 21 of the primary body 20 and is open to pass air from an air source (not shown) into the bore defined in the air inlet rod 120'. The cylindrical wall 123 is bisected by and defines an axially extending air slot 125. Air holes 124 are defined through the bottom of the cylindrical wall 123'. The air slot 125 extends, and the air holes 124 are arrayed, substantially along the portion of the cylindrical wall 123 of the air inlet rod 120 that is within the bottom chamber 26'. The second end 122 extends into the bottom chamber 26' and is open to further facilitate the flow of air into the bottom chamber 26'. The air entering the air inlet rod 121' is under a higher pressure than the vacuum pressure created in the fuel vaporization unit 19 by the engine.

In the top chamber 27, the highly vaporized fuel/air mixture is introduced to and further vaporized by ambient air entering the top chamber 27 through air holes 49*a,b*. In this alternate embodiment, higher pressured ambient air is sucked through the air holes 49*a,b* into the vacuumized top chamber 27.

Figure 10:
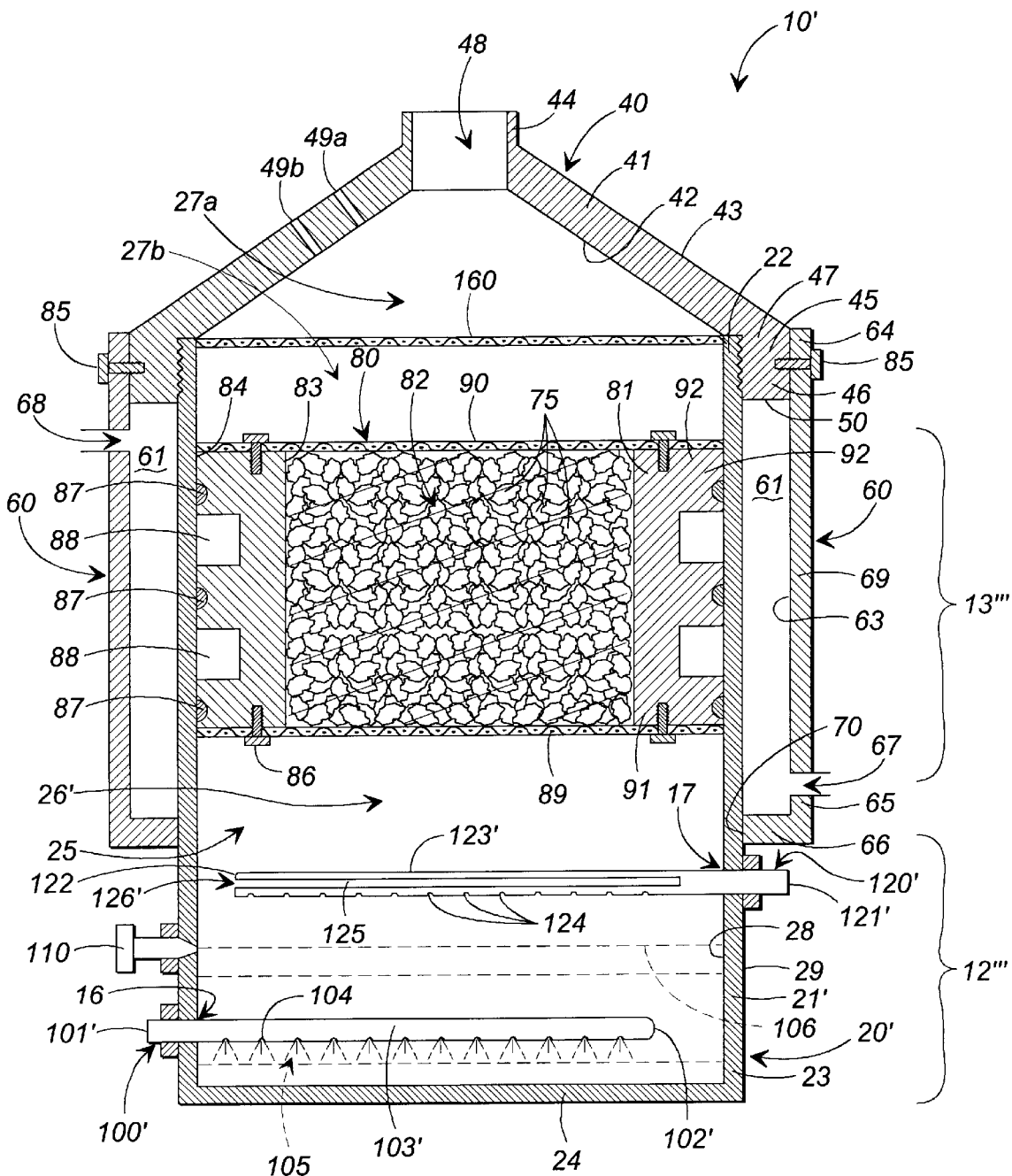
FIG. 10 is a partially sectioned, elevational view of a fuel vaporization unit in accordance with yet another alternate embodiment of the present invention.

FIG. 10 is a partially sectioned, elevational view of a fuel vaporization unit 19" in accordance with a second alternate unitary assembly embodiment of the present invention. The fuel vaporization unit 19" is substantially the same as the fuel vaporization unit 19' of FIG. 8, except for the below described differences. In this second alternate unitary assembly embodiment, the top chamber 27 of the fuel vaporization unit 19" is divided into separate vaporization chambers 27*a* and 27*b* by a vaporization screen 160 similar to screens 89,90. In this alternate embodiment, the added vaporization screen 160 is seated into an annular groove defined in the top end 22 of the inner surface 28 of the cylindrical outer shell 21' and extends parallel to the top screen 90.

Figure 11:
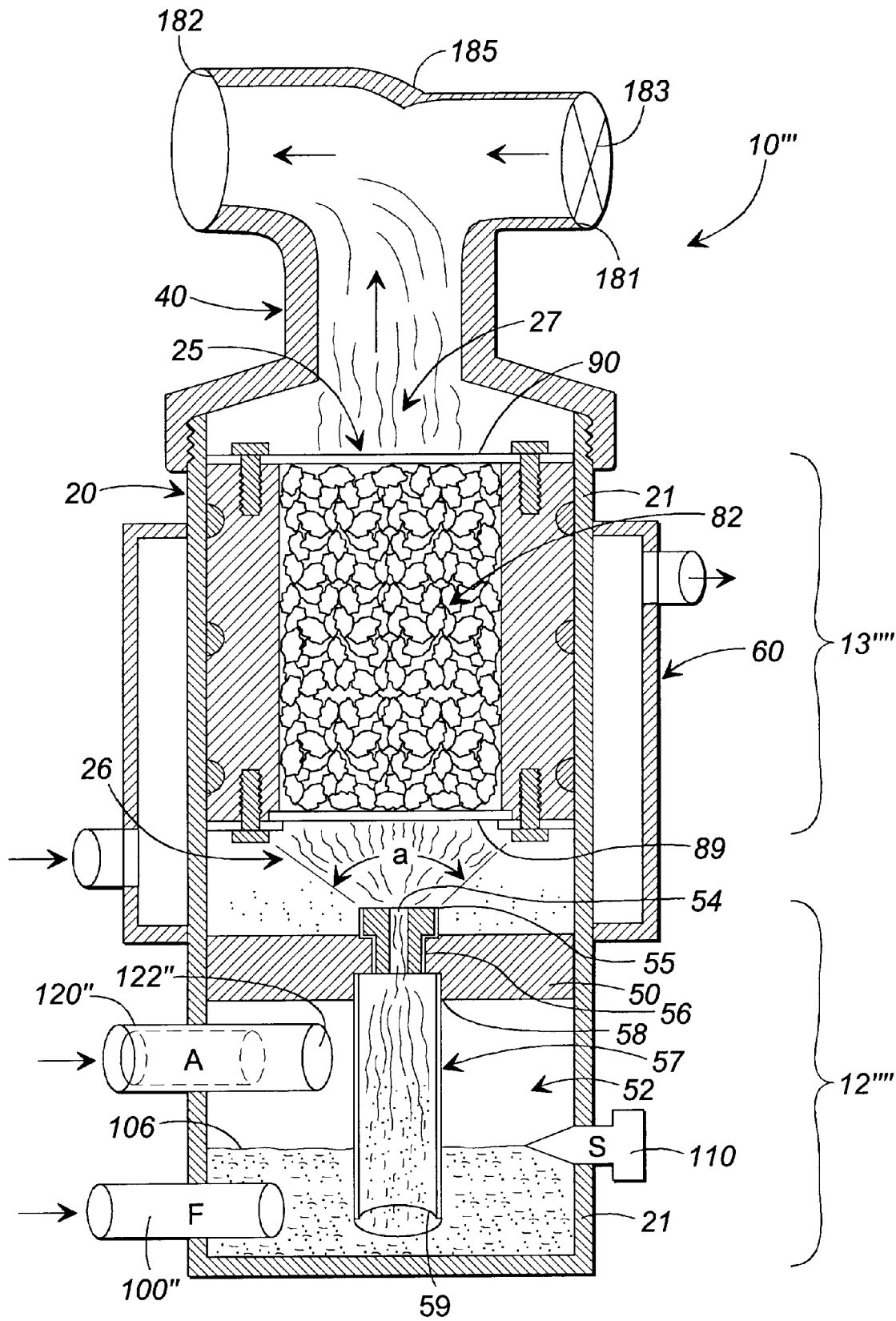
FIG. 11 is a partially sectioned, elevational view of a fuel vaporization unit in accordance with still another alternate embodiment of the present invention.

FIG. 11 is a partially sectioned, elevational view of a fuel vaporization unit 19''' in accordance with a third alternate unitary assembly embodiment of the present invention. The general principles described with respect to the previous embodiments are embodied in this third alternate unitary assembly embodiment; and, as such, not all components, elements and functions will be discussed with respect to this embodiment, whereas distinguishing aspects are discussed below. It is seen that this third alternate embodiment of FIG. 11 embodies the axially extending vaporization cavity 25 defined within the cylindrical outer-shell 21 of the primary body 20. In this embodiment, however, the bottom limit of the vaporization cavity 25 is defined by a circular divider plate 50 which is press-fit or otherwise mounted within the cylindrical outer-shell 21. As a result of this divider plate 50, the primary body 20 defines, below the vaporization cavity 25, a fuel preparation chamber 52. A fuel rod 100" delivers fuel (from the fuel reservoir 77 and fuel pump 79) into the preparation chamber 52. The level of fuel in the preparation chamber 52 is regulated to a maximum fuel level 106 by the operation of the fuel lever sensor 110 (and its related system components). In the preferred embodiment of this third unitary assembly embodiment, an air inlet rod 120" delivers air from an appropriate air source 76 into the preparation chamber 52, at a location above the maximum fuel level 106. Fuel exits the preparation chamber 52 through a jet outlet 55 of a jet nozzle 54 which is mounted in, for example, a threaded aperture 56 defined in the divider plate 50. The jet 54 is, acceptably, a spray nozzle of the type used in automobile carburetors. Preferably, the jet 54 is a spray nozzle with a spray angle "a" of 60–100 degrees. Liquid fuel is directed to the jet 54 along a delivery tube 57 which is mounted to a lower aperture 58 (aligned with the threaded aperture 56), for example by threading or press-fit, in the bottom side of the divider plate 50. The delivery tube 57 extends from the divider plate 50 to a position well below the maximum fuel level 106 such that the open entry end 59 of the hollow delivery tube 57 will be deep enough within the fuel to "suck fuel" under most operating conditions. Preferably, the components shown within the preparation chamber 52 (the placement of the inner end 122 of the air inlet rod 120", the height and width of the preparation chamber 52, and the maximum fuel level 106) are of such relative placement and dimensions that, when the primary body 20 is tilted to an angle as much as 60° from the horizontal, fuel will not easily enter into the air inlet rod 120" and the entry end 59 of the delivery tube will still be immersed in fuel. The primary function of the air, in this embodiment, which enters through air inlet rod 120" is to assist in maintaining within the preparation chamber 52, in connection with the fuel pump 79, the jet nozzle 54, and the engine vacuum, at an appropriate pressure to move the fuel through the vaporizer apparatus 10'''.

The vaporization cavity 25 of this embodiment of FIG. 11 is seen as being divided into at least three vaporization chambers; the bottom vaporization chamber 26, the main vaporization chamber 82, and the top vaporization chamber 27. Other components, including but not limited to the heat jacket 60, cap 40 and cross member 185 are similar to those discussed previously in other embodiments.

In operation, the fuel vaporization unit 19''' of FIG. 11 operates such that liquid fuel, aided by the pressure differential created by the engine 78, fuel pump 79 and other pressure differentials within the fuel preparation chamber 52 traverses the delivery tube 57 and is sprayed from the jet nozzle 54 into the bottom vaporization chamber 26. This spraying of fuel from the jet 55 initiates the vaporization process associated with the present invention. The fuel is drawn through the bottom vapor screen 89 into and through the main vaporization chamber 82, with its silica crystals 75, through the top vapor screen 90, into and through the top vaporization chamber 27—the fuel being further vaporized as it migrates through the various vaporization chambers and screens. The fuel, at whatever degree of vaporization it has reached upon exiting the top chamber 27, mixes with air in the cross member 185 and the fuel/air mixture is delivered through outlet 182 to the carburetor 187 or intake manifold 189.

It is considered within the scope of the present invention to include a plurality of vaporization screens dividing the vaporization cavity 25 into a plurality of vaporization chambers. Furthermore, more than one vaporization chamber may be filled with silica crystal or similar material as described above. In another alternate unitary assembly embodiment of the present invention, the heat jacket 60 of the preferred embodiment extends below the bottom wall 24 such that the heating chamber 61 is defined below the bottom wall 24 and substantially along the cylindrical outer shell 21 of the primary body 20. In yet another alternate unitary assembly embodiment, the heat jacket extends only under the bottom wall 24 such that the heating chamber 61 is defined only beneath and along the bottom wall 24. Therefore, it is seen that the scope of the present intention includes a vaporization cavity divided into more or fewer vaporization chambers and that the heating chamber may be omitted or proportioned to enclose smaller or larger portions of the cylindrical outer shell 21 of the fuel apparatus 10.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relationships shown on the drawings are given as the preferred relative relationships, but the scope of the invention is not to be limited thereby.

I claim:

1. In combination,
    an internal combustion engine including a combustion chamber;
    a first source of misted fuel;
    conduit connecting said first source of misted fuel to said engine, said conduit including a wall member defining an internal passage, whereby misted fuel from said first source of misted fuel is communicated through said passage to said engine for entry into said combustion chamber,
    an air inlet aperture defined through said wall member, whereby air is communicated from an air source into said internal passage of said conduit, said aperture being defined in said wall member at a position between said first source of misted fuel and said engine; and
    a screening device positioned between said inlet aperture and said combustion chamber,
    wherein said wall member of said conduit defines a smooth, curved inner wall surface defining a generally cylindrical internal passage, said inner wall surface being defined in planer cross-section by concentric arcs of constant radius.

2. The combination of claim 1 wherein said inner wall surface is defined in planer cross-section by concentric arcs defining arc angles in the range from 0° to 90°, inclusive.

3. The combination of claim 2, wherein said inner wall surface is defined in cross-section by concentric arcs defining arc angles in the range of 45° to 90°, inclusive.

4. The combination of claim 1, wherein said conduit further defines an outlet orifice adjacent said engine, said outlet orifice defining in its end view a circle.

5. The combination of claim 4, wherein said screening device is positioned within said internal passage of said conduit and adjacent said outlet orifice.

6. The combination of claim 1, wherein said conduit further defines an outlet orifice adjacent said engine, said outlet orifice occupying generally the plane defined by a common radius of said two concentric arcs for said inner wall surfaces.

7. The combination of claim 1, further comprising means associated with said inlet aperture for controlling the flow of air through said inlet aperture.

8. The combination of claim 1, wherein said screening device comprises a plurality of screens placed adjacent and abutting one another, wherein each screen of said plurality of screens is defined by a mesh in the range of 20 to 100 mesh, inclusive.

9. An air/fuel delivery assembly for use in the delivery of an air and fuel mixture from a first source of misted fuel to an internal combustion engine, said assembly comprising:
    a conduit including a wall member defining an internal passage, an inlet end of said passage and an outlet end of said passage;
    a screening device positioned across said passage between said inlet end and said outlet end; and
    an air inlet aperture defined through said wall member, whereby air is communicated from an air source into said internal passage of said conduit, said aperture being defined in said wall member at a position between said inlet end and said screening device,
    wherein said wall member of said conduit defines a smooth, curved inner wall surface defining a generally cylindrical internal passage, said inner wall surface being defined in planer cross-section by concentric arcs of constant radius.

10. The assembly of claim 9, wherein said inner wall surface is defined in planer crosssection by concentric arcs defining arc angles in the range from 0° to 90°, inclusive.

11. The assembly of claim 10, wherein said inner wall surface is defined in cross-section by concentric arcs defining arc angles in the range of 45° to 90°, inclusive.

12. The assembly of claim 9, wherein said conduit further defines an outlet orifice at said outlet end, said outlet orifice defining in its end view a circle.

13. The assembly of claim 12, wherein said screening device is positioned within said internal passage of said conduit and adjacent said outlet orifice.

14. The assembly of claim 9, wherein said conduit further defines an outlet orifice at said outlet end, said outlet orifice occupying generally the plane defined by a common radius of said two concentric arcs for said inner wall surfaces.

15. The assembly of claim 9, further comprising means associated with said inlet aperture for controlling the flow of air through said inlet aperture.

16. The assembly of claim 9, wherein said screening device comprises a plurality of screens placed adjacent and abutting, one another, wherein each screen of said plurality of screens is defined by a mesh in the range of 20 to 100 mesh, inclusive.

17. An air/fuel delivery assembly for use in the delivery of an air and fuel mixture from a first source of misted fuel to an internal combustion engine, said assembly comprising:
    a conduit including a wall member defining an internal passage. an inlet end of said passage and an outlet end of said passage;
    a screening device positioned across said passage between said inlet end and said outlet end; and
    an air inlet aperture defined through said wall member, whereby air is communicated from an air source into said internal passage of said conduit, said aperture being defined in said wall member at a position between said inlet end and said screening device,
    wherein said internal passage defines a circular cross-section and said passage tapers in internal diameter from narrower at a first end adjacent said first source of misted fuel to wider at a second end.

\* \* \* \* \*